United States Patent [19]

Schley

[11] Patent Number: 5,003,681
[45] Date of Patent: Apr. 2, 1991

[54] BRAKE TOOL

[76] Inventor: Paul E. Schley, 5511 E. Cerritos Dr., Orange, Calif. 92669

[21] Appl. No.: 579,337

[22] Filed: Aug. 6, 1990

Related U.S. Application Data

[63] Continuation of Ser. No. 228,470, Aug. 5, 1988, abandoned, which is a continuation of Ser. No. 52,920, May 22, 1987, abandoned.

[51] Int. Cl.$^5$ ............................................. B25B 13/06
[52] U.S. Cl. ..................................... 29/239; 81/176.1; 81/176.15; 81/176.2
[58] Field of Search ......................... 29/265, 239, 428; 81/489, 484, 485, 488, 176.01, 176.1, 176.15, 176.7

[56] References Cited

U.S. PATENT DOCUMENTS

| | | | |
|---|---|---|---|
| 673,056 | 4/1901 | Jacobs | 81/176.15 |
| 3,140,625 | 7/1964 | Pannozzo | 81/176.15 |
| 3,835,522 | 9/1974 | Word | 29/239 |
| 3,896,686 | 7/1975 | Swinney | 81/484 |
| 4,569,259 | 2/1986 | Rubin | 81/121.1 |
| 4,809,567 | 3/1989 | Bongard | 29/239 |

Primary Examiner—Frederick R. Schmidt
Assistant Examiner—Blynn Shideler
Attorney, Agent, or Firm—Plante, Strauss, Vanderburgh & Connors

[57] ABSTRACT

Disclosed is a tool for use with brake pistons and the like having a generally cylindrical body with a working face at one end of the body member which has an area and configuration corresponding to the face of the piston. The piston has one or more shall depressions therein which are normally unsuitable for use with conventional tools. The characterizing feature of the tool is a rim extending outwardly from the working face and surrounding it. When the tool is placed over the face of the piston, the rim grips the perimeter of the piston. A pin extending outwardly from the working surface is aligned with the deepest depression when the tool is placed over the face of the piston. The rim and pin coact to rotate the piston upon rotation of the tool.

1 Claim, 2 Drawing Sheets

BRAKE TOOL

This a continuation, of application Ser. No. 07/228,470; filed Aug. 5, 1988 now abandoned which is a continuation of Ser. No. 052,920 filed May 22, 1987 now abandoned.

BACKGROUND OF THE INVENTION

1. Field of the Invention

This invention relates to a tool for rotating a brake piston or the like and, in particular, relates to a tool to be used with a brake piston which has shallow depressions in the piston face that are unsuitable to coact with conventional tools used for rotating a brake piston within its cylinder.

2. Background Discussion

In the installation of brake pads in automobiles, it is a conventional practice simply to rotate the brake piston which is rotatably mounted within its cylindrical housing to provide sufficient clearance for the installation of brake pads. Schley Products, Inc., the assignee of this patent application, makes a tool for this purpose. This tool includes a generally cylindrical body member which has a central opening, usually of a square or hexagonal configuration, and two pins which are spaced apart and project outwardly from one end of the cylindrical body member. The face of most conventional pistons have depressions therein which are sufficiently deep to enable the two pins to lodge in these depressions when the tool is placed in an abutting relationship on the face of the piston. A driver device having a square or hexagonal configured element is then inserted into the central opening of the tool. A wrench is then used to rotate the driver element, which in turn rotates the tool which grips and turns the piston through the two pins extending into the depressions in the face of the piston.

Although this tool may be used with most automobiles, some makes of automobiles do not have depressions of sufficient depth in the face of the piston to enable the pins to grip the piston and turn it. For example, General Motors automobiles only have depressions in their face which are approximately 0.100 inch deep or less. These depressions are along the perimeter of the face of the piston and are of an inadequate depth to enable the two pins of the conventional tool to grip the piston and rotate it.

SUMMARY OF THE INVENTION

The problem discussed above has been obviated by the present invention which provides a simple, low cost tool which enables pistons having only shallow depressions in their face to be rotated. There are several features of this invention, no single one of which is solely responsible for its desirable attributes. Without limiting the scope of this invention, as expressed by the claims, its more prominent features will now be discussed briefly. After considering this discussion, and particularly after reading the section of the application entitled "DETAILED DESCRIPTION OF THE PREFERRED EMBODIMENT" one will understand how the features of this invention provide the advantages of low cost, simplicity, and convenience.

One feature of the present invention is employing a cylindrical body member having a generally circular side wall which extends outwardly from one end of the body member to provide a rim which surrounds the working face of the tool. This rim has a generally circular configuration and its diameter will be slightly larger than the diameter of the brake piston or the like it is designed to rotate. Such pistons also have a generally circular face with a diameter slightly less than the diameter fo the corresponding rim of the tool to be used to rotate the piston. Thus, by placing the working face of the tool in an abutting relationship with the face of the piston, the rim will slightly overlap the perimeter of the face of the piston. This is important to enable the tool to grip the piston and turn it upon rotation of the tool.

The second feature of this invention is the use of a pin extending outwardly from the working surface of the tool. This pin is positioned so that it will be aligned with one of the shallow depressions on the face of the piston. Preferably, it will be aligned with the depression which is of the greatest depth. The pin extends into the depression when the tool is placed over the face of the piston with the working surface of the tool and the face of the piston abutting each other. Proper alignment of the tool relative to the face of the piston brings the pin into registration with the shallow depression on the face of the piston allowing the working face of the tool to abut the face of the piston and the rim of the tool to grasp the perimeter of the face of the piston. The central opening of the tool will be in coaxial alignment with the longitudinal axis of the piston upon proper alignment of the tool and piston.

The third feature of this invention is the control of the dimensions of the tool to enable it to be used with pistons of different diameters and having depressions therein of differing depths. The diameter of the working face of the tool should be slightly greater than the diameter of the face of the piston and generally ranges between about 1 and 3 inches. Both the face of the piston and the working face of the tool will be circular. Thus the working face has a surface that is slightly greater in area than the face of the piston. Since the depressions on the face of the piston will vary in depth, the length of the pin will vary depending on what type of piston it is to be used with. Typically, the length of the pin will range between 0.075 and 0.125 inch. This corresponds to the depth of most depressions provided in the face of the piston. The height of the rim should be sufficient to provide a firm grasp on the piston. Typically, it will exceed 0.05 inch and will normally range between 0.05 inch and 0.200 inch.

The preferred embodiment of this invention illustrating all its features will now be discussed in detail. This embodiment shows the device of this invention being used with a General Motors brake piston. It could be used with any particular brake piston or comparable structure where it is desired to rotate the structure and the structure does not have suitable depressions in its face to allow the use of a conventional tool.

BRIEF DESCRIPTION OF THE DRAWING

The tool of this invention is illustrated in the drawing, with like numerals indicating like parts, and in which.

DESCRIPTION OF THE PREFERRED EMBODIMENT

Figure 1:
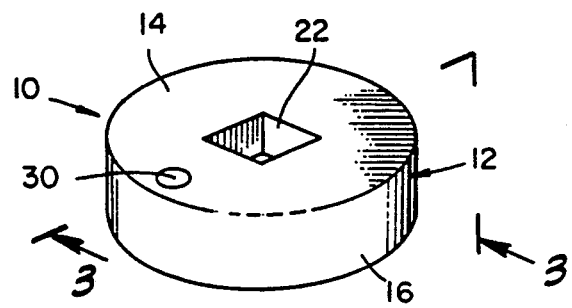
FIG. 1 is a perspective view of the tool of this invention showing the outer surface of the tool.
Figure 2:
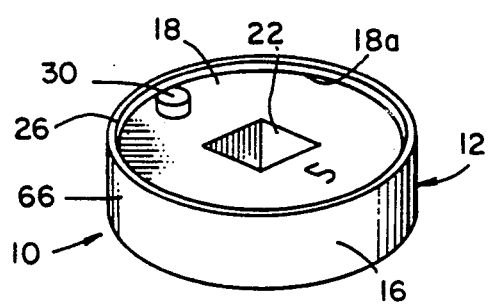
FIG. 2 is a perspective view of the tool of this invention inverted from the position shown in FIG. 1, and showing the working face of the tool.
Figure 3:
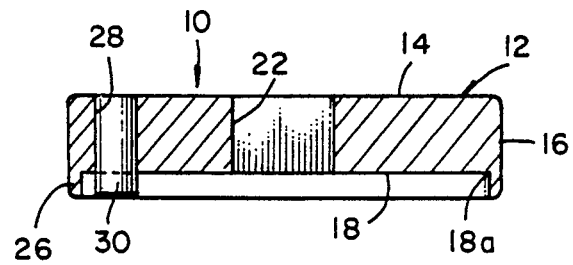
FIG. 3 is a cross-sectional view taken along line 3—3 of FIG. 1.

As shown in FIGS. 1 through 5, the tool 10 of this invention includes a generally solid cylindrical body 12 made of hardened steel or other suitable metal. The cylindrical body has a top surface 14, side wall 16, and working face 18. The working face 18 is generally defined by a circular perimeter 18a and has a diameter which is slightly greater than the diameter of the face 20a of a piston 20 (FIG. 4) to be rotated by the tool 10. There is an enlarged central opening 22 in the body 12. This enlarged central opening 22 has a square configuration, although any irregular configuration that would allow a driver device 24 (FIG. 6) to be inserted into the opening 22 to rotate the tool would be suitable. For example, a hexagonal shaped hole would be suitable. Instead of using the driver device 24 inserted into the opening 22, a handle could be attached to the tool to provide leverage for rotating the tool.

Figure 4:
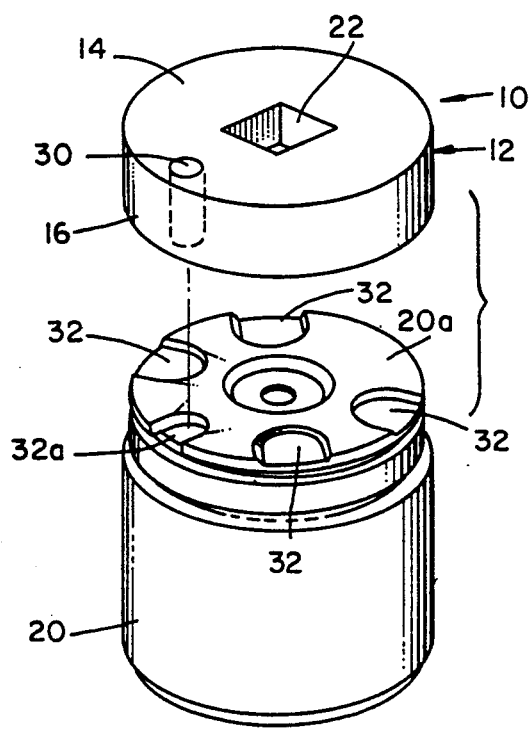
FIG. 4 is an exploded perspective view showing the tool of this invention being placed on a General Motors brake cylinder.

In accordance with one feature of this invention, the side wall 16 of the body 12 extends outwardly from the working face 18 at the perimeter 18a to form a rim 26 which surrounds the working face. This rim 26 has a height which is sufficient to enable to the tool 10 to grip the perimeter of the piston 20. For example, the rim may have a height ranging between 0.050 and 0.200 inch. There is a hole 28 drilled through the body 12 near its perimeter and a solid metal pin 30 is force fitted into this hole with a portion of the pin extending outwardly from the working face 18. The position of this pin in the tool is determined by the type of piston it is to be used with. As best illustrated in FIG. 4, the pin 30 is positioned so that when the tool 10 is aligned with the piston so that the longitudinal axis of the piston coincides with the longitudinal axis of the tool, the tool may be rotated relative to the face of the piston so that the pin will drop into one of the depressions on the face of the piston. FIG. 4 illustrates a General Motors brake piston 20 which has five depressions 32, the deepest depression being the middle one, depression 32a, which has a depth of approximately 0.125 inch. The pin 30 is designed to coact with this particular depression 32a and the portion of the pin extending from the working face 18 has a length which is slightly less than 0.125 inch. Thus, when the tool 10 is placed over the piston 20 so that the face 20a of the piston and the working face 18 of the tool abut one another, the tool may be manually rotated so that the pin 30 may be aligned with the depression 32a. When it comes into alignment with this depression 32a, the working face 18 will abut the planar portions of the piston face 20a. The tool 10 is now properly positioned with respect to the piston 20 as shown in FIG. 5 and rotation of the tool will result in rotation of the rotatably mounted piston.

OPERATION

Figure 5:
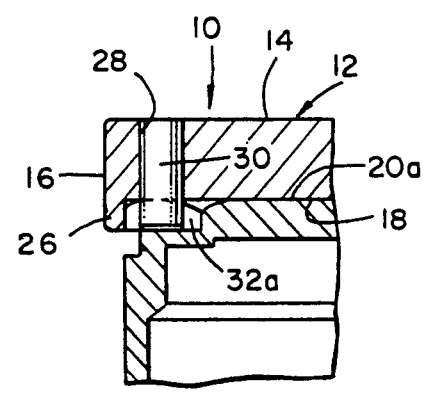
FIG. 5 is a fragmentary view showing the pin inserted into a depression on the face of the piston.
Figure 6:
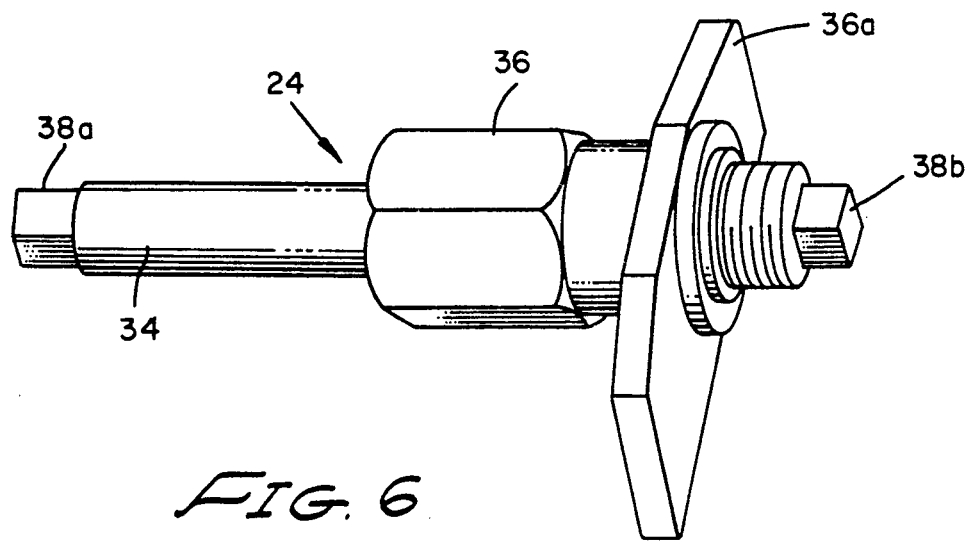
FIG. 6 is a perspective view of the driver device used to rotate the tool after it is placed in position over the brake piston.

As illustrated in FIGS. 5 and 6, the tool 10 of this invention is used in conjunction with the driver device 24 to rotate the rotatably mounted brake piston 20. Although it is desirable to use the driver device 24, it is not necessary and other devices could be used to rotate the tool.

As shown in FIG. 6, the driver device 24 consists of a elongated screw element 34 mounted in a nut housing 36 and a rotatable flange 36a carried on the nut housing. The screw element 34 rotates within the housing and has at both its ends square-shaped terminals 38a and 38b. The one terminal 38b is inserted into the square-shaped central opening 22 in the tool 10 with the flange 36a of the housing 36 abutting the forward lip 40 of the brake housing 42. The piston 20 is rotatably mounted in the brake housing 42 and is rotated by the tool 10 being turned upon rotation of the elongated screw element 34. This is achieved by use of a wrench which grips the terminal end 38a of the screw element 34.

Figure 7:
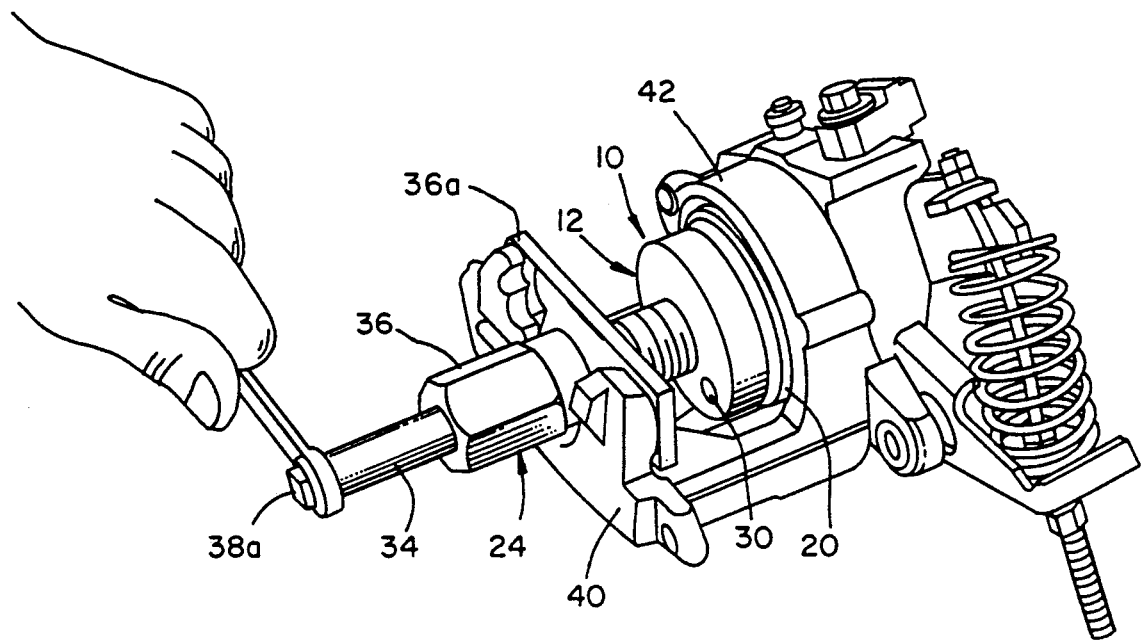
FIG. 7 is a perspective view of the tool of this invention in position on a General Motors disc brake caliper, showing the rotably mounted brake piston with the driver in position and being manually rotated using a wrench. The disc brake calipler shown is used for both standard and emergency brake operation.

As shown in FIG. 7, the tool 10 is placed over the piston 20 so that the working face 18 abuts the face 20a of the piston. The rim 26 grips the perimeter of the piston 20 and the pin 30 is inserted into the depression 32a. The end 38b of the element 34 is placed into the central opening 22 and the nut housing 36 is tightened manually until the flange 36a abuts the forward lip 40 of the cylinder housing 42. By manually rotating the screw element 34, the tool 10 rotates the piston within the housing.

In accordance with this invention, the rim 26 makes a contact point with the perimeter of the piston 20 and the pin makes another contact point with a wall portion of the depression 32a. Since there are two points of contact with the piston 20, the tool 10 upon rotaion will grasp the piston and force it to rotate. Even though there is only a shallow depression 32a on the face of the piston 20 interacting with the pin 30, the rim 26 provides the additional contact point or surface enabling the tool 10 to rotate the piston. The conventional tool does not include this rim.

Although more than one pin 30 may be used, pins alone would be inadequate the provide the sufficient contact with the face of the piston to enable it to be turned. In other words, if the rim was not present and two or more pins were extending from the face of the tool and engaging depressions 32 in the face 20a of the piston, rotation of the tool 10 would result in the working face slipping with respect to the face of the piston because the pins would slip from the depressions. The presence of the rim 26, which has sufficient height to prevent such slippage, however, provides the additional contact surface along the perimeter of the piston 20 to enable the tool 10 to turn the piston.

SCOPE OF THE INVENTION

The above description presents the best mode contemplated of carrying out the present invention. This invention is, however, susceptible to modifications and alternate constructions from the embodiment shown in the drawing and described above. Consequently, it is not the intention to limit this invention to the particular embodiment disclosed. On the contrary, the intention is to cover all modifications and constructions coming within the spirit and scope of the invention as expressed by the claims.

I claim:

1. In the installation of brake pads in automobiles wherein a brake piston is rotated, said brake piston having a generally flat planar face of a predetermined diameter and at least one shallow depression in the face,
 (a) grasping the brake piston with a tool comprising
  a cylindrical body member having a side wall and a flat planar working face at one end of the body member which abuts the flat planar face of the piston upon grasping the brake piston with the tool,
  said working face being surrounded by an outwardly projecting rim which is an extension of the side wall, said rim being at right angle with respect to the working face and defining a surface area which is slightly greater than the area of the face of the piston and having a diameter slightly greater than the diameter of the face of the piston,
  a central opening in the body member adapted to receive a device which, upon insertion into the opening and rotation thereof, coacts with the central opening to rotate the tool, and
  a single pin extending outwardly from the working face at a right angle with respect to said flat planar working face and adapted to inserted into said one depression in the face of the piston, said pin, upon rotation of the tool, coacting with the rim, which grips the piston, to rotate the piston when the tool engages the piston, said working face being free of pins other than the single pin,
 (b) aligning the single pin with said one depression and bringing the working face of the tool into abutting relationship with the planar face of the brake piston to insert the single pin into said one depression, and
 (c) inserting the device into the central opening and rotating the tool to rotate the brake piston.

* * * * *

UNITED STATES PATENT AND TRADEMARK OFFICE
CERTIFICATE OF CORRECTION

PATENT NO. : 5,003,681
DATED : April 2, 1991
INVENTOR(S) : Paul E. Schley

It is certified that error appears in the above-identified patent and that said Letters Patent is hereby corrected as shown below:

On the title page, item [57] Abstract:

Line 5 delete "shall" and insert therefor --shallow--

Column 2, line 6, delete "fo" and insert therefor --of--

Column 3, line 13, delete "calipler" and insert therefor --caliper--

Column 4, line 47, after "inadequate" delete "the" and insert therefor --to--

Column 6, line 9, after "to" insert --be--

Signed and Sealed this

Twenty-second Day of September, 1992

*Attest:*

DOUGLAS B. COMER

*Attesting Officer*     *Acting Commissioner of Patents and Trademarks*